United States Patent
Hwang et al.

(10) Patent No.: US 6,903,675 B1
(45) Date of Patent: Jun. 7, 2005

(54) INTELLIGENT MICROWAVE DETECTING SYSTEM

(76) Inventors: Shih-Ming Hwang, 16842 Millikan Ave., Irvine, CA (US) 92606;
Chien-Jong Hwang, 16842 Millikan Ave., Irvine, CA (US) 92606;
Liang-Lun Hwang, 16842 Millikan Ave., Irvine, CA (US) 92606

(*) Notice: Subject to any disclaimer, the term of this patent is extended or adjusted under 35 U.S.C. 154(b) by 0 days.

(21) Appl. No.: 10/760,405

(22) Filed: Jan. 21, 2004

(51) Int. Cl.[7] ............................................. G01S 13/04
(52) U.S. Cl. ........................... 342/27; 342/20; 342/22; 342/28; 342/59; 342/175; 342/195
(58) Field of Search ............................. 342/13–20, 22, 342/27, 28, 52–60, 82–103, 175, 192–197; 340/540, 541, 550, 551, 552–554, 561–567

(56) References Cited

U.S. PATENT DOCUMENTS

| | | | | |
|---|---|---|---|---|
| 3,680,074 A | * | 7/1972 | Lieser | 342/28 |
| 3,691,558 A | * | 9/1972 | Hoard et al. | 342/28 |
| 3,728,721 A | * | 4/1973 | Lee et al. | 342/28 |
| 3,794,992 A | * | 2/1974 | Gehman | 342/28 |
| 3,947,834 A | * | 3/1976 | Gershberg et al. | 342/28 |
| 3,987,427 A | * | 10/1976 | Clift | 342/28 |
| 4,012,730 A | * | 3/1977 | Nicholls | 342/28 |
| 4,083,049 A | * | 4/1978 | Mattern et al. | 342/28 |
| 4,101,875 A | * | 7/1978 | Humphries | 342/28 |
| 4,107,659 A | * | 8/1978 | Massa | 342/28 |
| 4,142,187 A | * | 2/1979 | Nakayama | 342/28 |
| 4,195,289 A | * | 3/1980 | Cole | 342/28 |
| 4,201,982 A | * | 5/1980 | Humphries | 342/28 |
| 4,225,858 A | * | 9/1980 | Cole et al. | 342/28 |
| 4,435,699 A | * | 3/1984 | Tacussel | 342/28 |
| 4,527,151 A | * | 7/1985 | Byrne | 342/28 |
| 5,345,240 A | * | 9/1994 | Frazier | 342/28 |
| 5,912,620 A | * | 6/1999 | Lin et al. | 342/28 |

* cited by examiner

Primary Examiner—Bernarr E. Gregory
(74) Attorney, Agent, or Firm—Rosenberg, Klein & Lee

(57) ABSTRACT

An intelligent microwave detecting system comprises: a power supply source for supplying the electric power to a passive electric equipment which is connected to the power supply source, an output controller connected to the circuit including the power supply source and the passive electric installation so as to control operation of the passive electric installation, a microwave detector connected with the output controller to transmit all-directional microwave to a defined three dimensional space so as to detect the state of moving objects therein and send a detection signal to the output controller for judging should the passive electric installation be actuated. The microwave radiated from the microwave detector is all-directional and capable of piercing through the building structure and is resistant to the environmental interference therefore a wide range and precise detection can be expected, besides, the detector of this type can detect non-heat generating intrusion objects.

5 Claims, 4 Drawing Sheets

INTELLIGENT MICROWAVE DETECTING SYSTEM

BACKGROUND OF THE INVENTION

1. Field of the Invention

The present invention relates to an intelligent microwave detecting system, and more particularly, to a detecting system containing a microwave detector capable of, detecting moving objects in a defined three dimensional space by the microwave piercing through the hard building structure formed of materials such as glass, concrete, and wooden block so as to actuate passive security systems under its control, and the detection signals can be transmitted to actuate simultaneously other security systems located at remote places.

2. Description of the Prior Art

There are several types of detecting system available on the market. One of them is the system which utilizes an active infrared sensing installation comprising an infrared transmitter and an infrared sensor capable of detecting moving objects in a defined area.

In the above detection system, infrared beam emitted from an infrared transmitter is used for the detection of moving objects. When the infrared beam is intercepted by a moving object and is unable to emit back to the infrared receiver, a signal will be delivered from the sensor to trigger the passive security mechanism installed to the detection system such as intrusion alarm, security lighting and other means of warning.

However, there are several inherent disadvantages implied in its construction and way of application, namely:

1. The effective detection area is limited in a linear direction instead of covering a three dimensional space.

2. Active infrared detection system requires an infrared transmitter and receiver to be installed in two separate ends of a detection space, which sometimes results in the over extension of the wiring, causing possible inconvenience in operation.

There is another detecting system available on the market known to be a passive infrared detector for detecting moving objects in a defined area.

Note that the passive infrared detector itself is not able to emit infrared beam, instead, it detects the infrared ray radiated from heat generating object entering into the defined detection area (wave length 8~14 um). When the infrared radiation is detected by a passive infrared detector, a signal will then be delivered from the passive infrared detector to actuate the passive security mechanism installed to the detection system.

However, similar to the former active detecting system, the latter passive detector can only effectively perform detection action in a liner direction instead of covering three dimensionally, and has several structural and production disadvantages, namely;

1. The detection of infrared radiation generated from the heat of an object, can be greatly effected during transmission, by unfavorable atmospheric condition such as rain, fog, or proximity to an unstable heat-generating object, causing lower sensitivity of the detector thus increase the possibility of false detection.

2. Passive infrared detector is highly prone to interference from environmental factors. Even though it's detection area consists a three dimensional coverage, however, so that the detection area is confined in an indoor area thereby severely lowering its practicality.

3. That the passive infrared detector is impossible to identify the object which is not heat generating.

In view of the fact that the prior detecting systems have the inherent defects described above, it is what the reason the inventor has put forth every effort for years by continuous research and experimentation, attempting to find out the remedy to palliate such shortcomings, and at last has succeeded in realizing the present invention.

The essential operation principle of the microwave detector according to the present invention is similar to the radar wave which can be reflected from a moving objects, the microwave reflected from the moving object is then verified to identify the position of this object. There is a great advantage that the microwave is able to pierce through the materials such as glass, concrete, and wooden block and is not interfered by the natural environmental condition.

SUMMARY OF THE INVENTION

Accordingly, the essential object of the present invention is to provide a microwave detector which is capable of detecting moving objects in a defined three dimensional space by the microwave piercing through the hard building structure formed of-materials such as glass, concrete, and wooden block so as to accurately identify the unknown object in the defined area and actuate the security equipment under its control, furthermore, the detection signals can be transmitted to actuate simultaneously other security equipment located at remote places.

To achieve above object, the present invention comprises: a power supply for supplying the electric power to a passive electric installation; a passive electric installation connected to the power supply; an output controller connected to circuit including the above-mentioned power supply and the above-mentioned passive electric installation, for judging if the above-mentioned passive electric installation should be actuated; a microwave detector connected with the above-mentioned output controller to transmit all directional microwave to a defined three dimensional space so as to detect the state of moving objects therein and send a detection signal to the above-mentioned output controller for judging if the above-mentioned passive electric installation should be actuated.

In this version, the unknown objects moving in a defined three dimensional area can be detected by the microwave detector and a detection signal is sent to the output controller from the microwave detector so as to enable the output controller to actuate the passive electric installation if necessary.

BRIEF DESCRIPTION OF THE DRAWINGS

The drawings disclose illustrative embodiments of the present invention which serve to exemplify the various advantages and objects hereof, and are as follows.

DETAILED DESCRIPTION OF THE PREFERRED EMBODIMENT

For fuller understanding of the construction, nature and characteristics of the invention, reference should be made to the following detailed descriptions taken in conjunction with the accompanying drawing.

Figure 1:
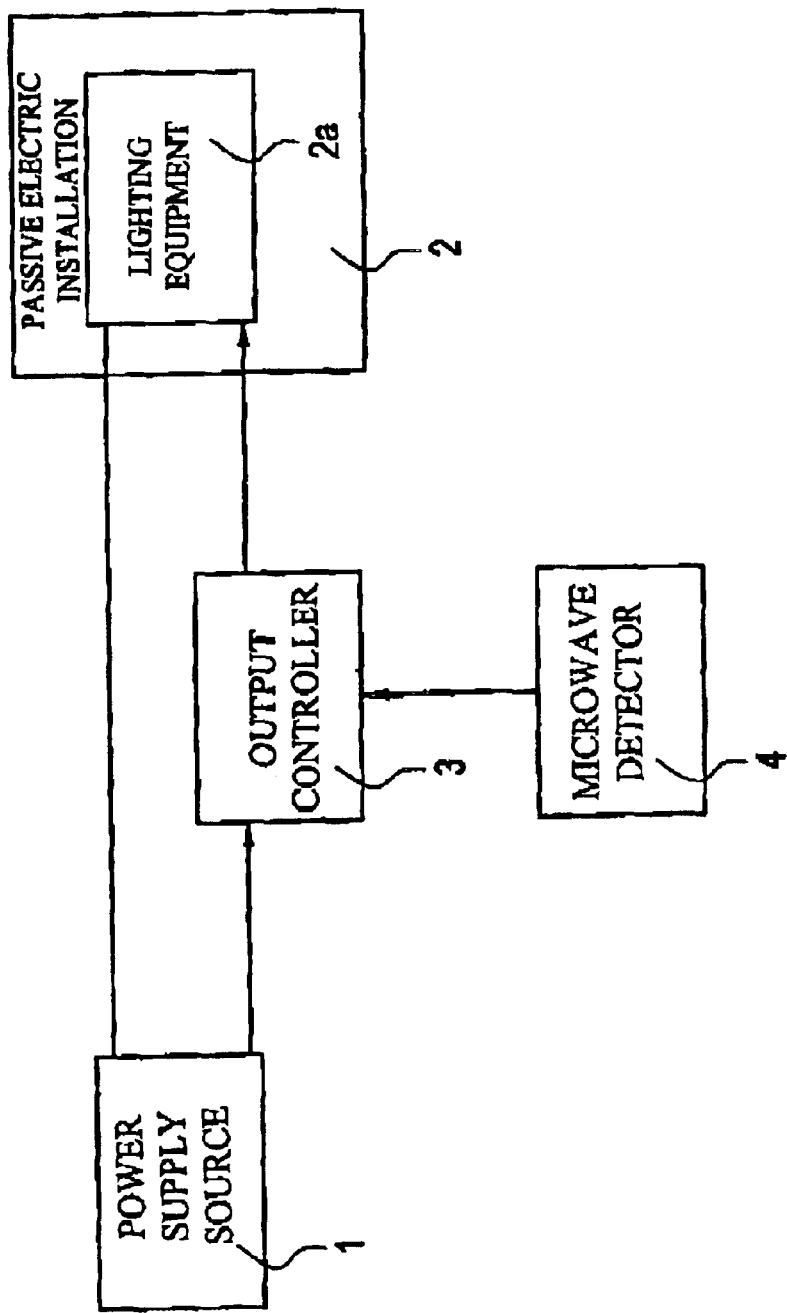
FIG. 1 is a block diagram of the present invention including a first and a second embodiments.

Referring to FIG. 1, the present invention essentially comprises a power supply source 1, a passive electric installation 2, an output controller 3, and a microwave detector 4.

The power supply source 1 is the power source of the security system of the present invention.

The passive electric installation 2 which may be a lighting equipment 2a, is connected to the power supply source 1.

The output controller 3 which is connected to the circuit including the power supply source 1 and the passive electric installation 2, is in series with the passive electric installation 2 so as to judge should the passive electric installation 2 be actuated.

The microwave detector 4 connected with the output controller 3 may be placed together with the passive electric installation 2 in a similar defined three dimensional space so as to detect the moving state of objects therein and send a detector signal to the output controller for making judgment should the passive electric installation 2 be actuated.

With this scheme, the microwave radiated from the microwave detector 4 is able to pierce through the structural obstruction such as glass, concrete, and wooden block to reach the defined three dimensional space so as to detect the moving state of objects therein and send a detection signal to the output controller 3 to actuate the passive electric installation 2, e.g. the lighting equipment 2a to illuminate.

In the second embodiment, the microwave detector 4 and the passive electric installation are placed in different spaces such that in case the microwave detector 4 detects somebody is moving at the detection front, it can immediately actuate the passive electric installation 2 which is located behind thereby achieving intelligent effect of beforehand prevention of possible intrusion.

Figure 2:
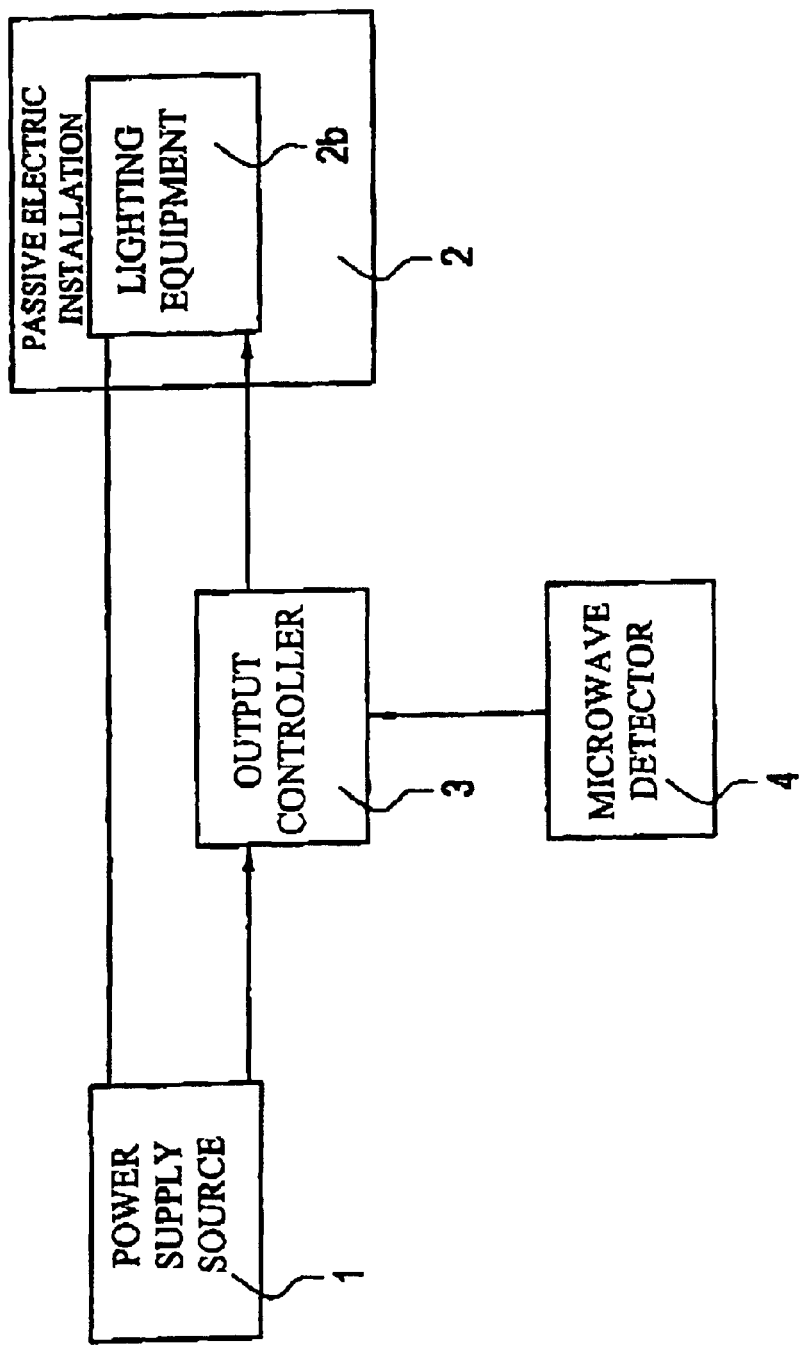
FIG. 2 is a block diagram in a third embodiment of the present invention.

FIG. 2 shows the third embodiment of the present invention, wherein the passive electric installation is an alarming device 2b.

With this scheme, in case there are unknown objects appear in the defined three dimensional detection area of the microwave detector 4, the output controller 3 is able to actuate the passive electric installation 2, e.g. the alarming device 2b so as to warn the trespassers to get out of the boundary.

Figure 3:
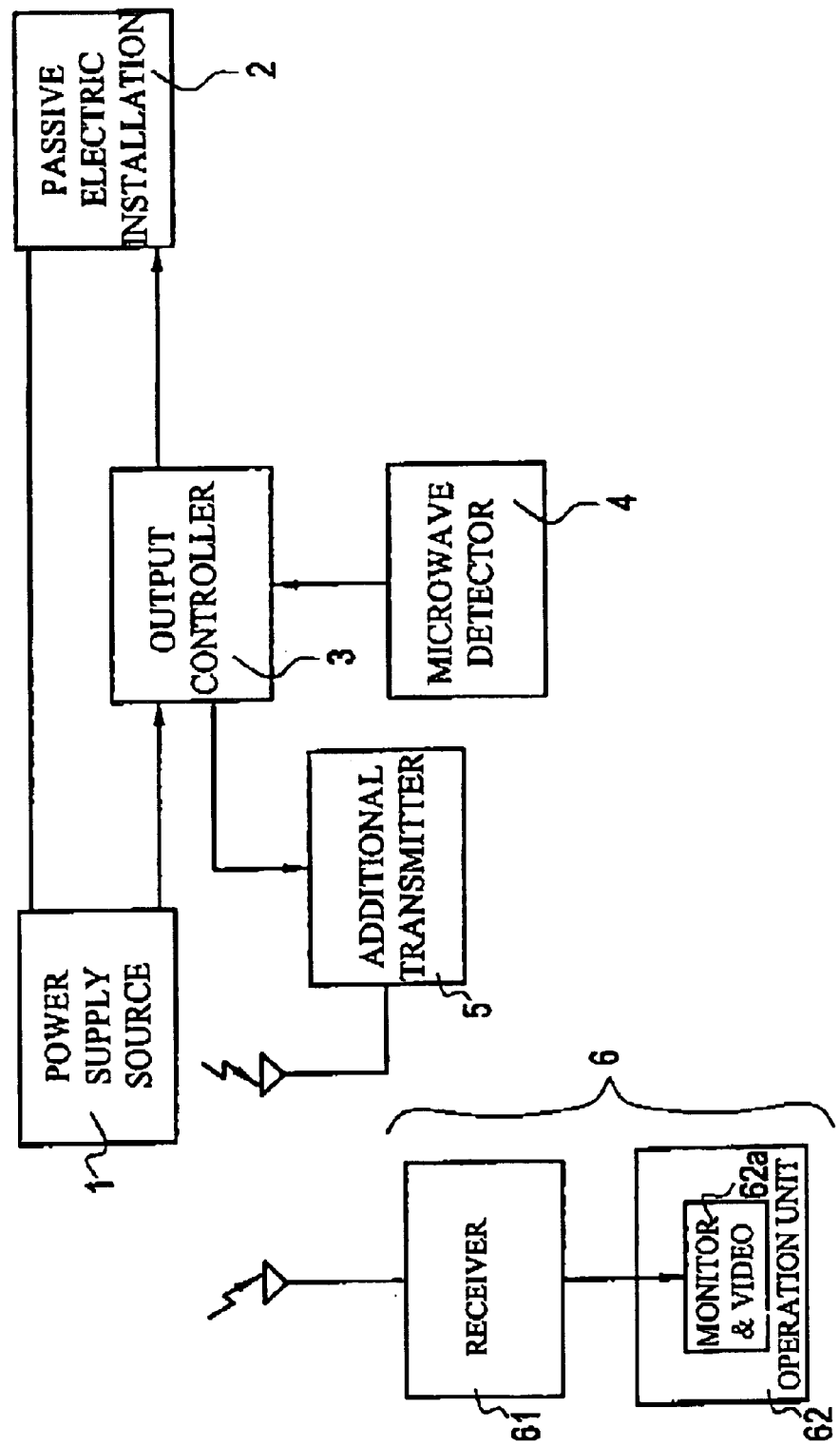
FIG. 3 is a block diagram in a fourth embodiment of the present invention.

FIG. 3 shows the fourth embodiment of the present invention, wherein an additional transmitter 5 and a remote equipment 6 are installed.

The transmitter 5 in connection with the output controller 3 can transmit the data detected by the microwave detector 4.

The remote equipment 6 includes: a receiver 61 for receiving the signal coming from the transmitter 5, and an operation unit 62 in connection with the receiver 61, the operation unit 62 may be a monitor and video set 62a, for determining whether or not to start operation according to the signal received by the receiver 61.

With this scheme, in case there are unknown moving objects appear in the defined three dimensional detection area of the microwave detector 4, the output controller 3 is able to actuate the passive electric installation 2 according to the detection signal coming from the microwave detector 4, so as to deliver a warning signal, and at the same time, the signal an be sent to the receiver 61 included in the remote quipment 6, and then the received signal is transferred to the operation unit 62, e.g. the monitor and video set 62a to monitor and snap the moving picture of the unknown objects.

Figure 4:
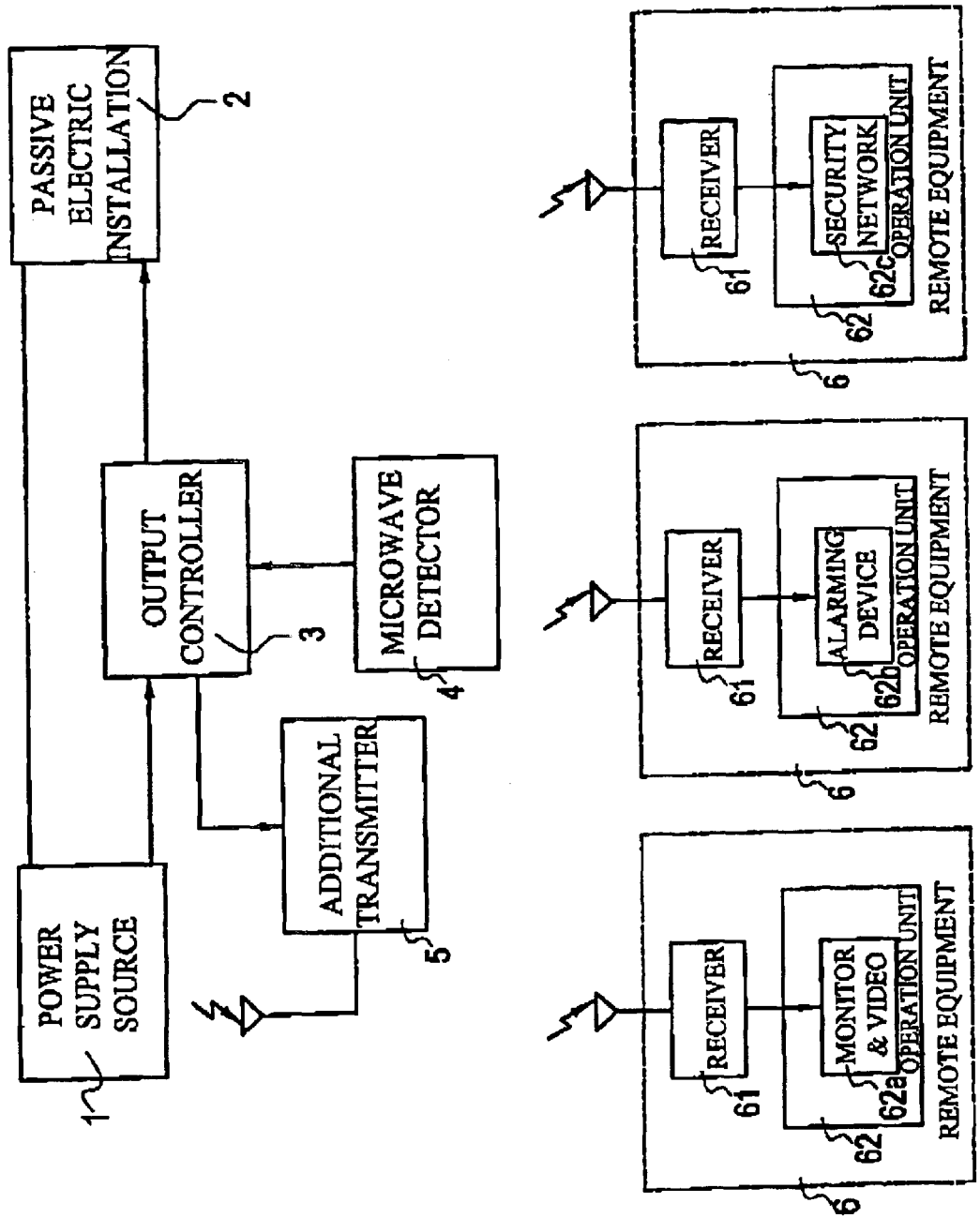
FIG. 4 is a block diagram in a fifth embodiment of the present invention.

FIG. 4 shows the fifth embodiment of the present invention, wherein there are three remote equipment 6, and the operation unit 62 of each remote equipment 6 further includes a monitor and video set 62a, an alarming device 62b, and a security network 62c.

With this scheme, in case there are unknown objects appear in the defined three dimensional detection are a of the microwave detector 4, the output controller 3 is able to actuate the passive electric installation 2 according to the detection signal coming from the microwave detector 4, so as to deliver a warning signal, and at the same time, the signal can be transmitted to the three remote equipment 6 via a transmitter such that each remote equipment 6 actuate its individual monitor and video set 62a, the alarming device 62b, and the security network 62c so as to achieve the overall security protection effect.

It emerges from the above description of five embodiments that the present invention has several noteworthy advantages, namely:

1. That the microwave detector is capable of detecting moving objects in a three directional protection area.

2. That the microwave radiated by the microwave detector is capable of piercing through the structural materials formed of glass, concrete and wooden block and withstanding the environmental interference so as to detect the state of moving objects in the protection area and deliver a signal to the output controller for precise identification.

3. That the output controller 3 connected to the circuit including the power supply source 1 and the passive electric installation 2, is in series with the latter directly so that installation of complicated extra circuits is not necessary.

4. That the present invention allows installation of a plurality of remote equipment 6 for a single microwave detector 4 so that a wide zone protection is made possible.

5. That the microwave detector is capable of detecting non-heat generating (namely, cold) intrusion objects.

Many changes and modifications in the above described above-described embodiments of the invention can, of course be carried out without departing from the scope thereof. Accordingly, to promote the progress in science and the useful arts, the invention is disclosed and is intended to limited only by the scope of the appended claims.

What is claimed is:

1. An intelligent microwave detecting system comprising:
 a power supply source for supplying power for said detecting system;
 a passive electric installation connected to said power supply source operable to indicate intrusion upon a predefined space;
 an output controller coupled to said power supply source and said passive electric installation for selectively enabling actuation of said passive electric installation;
 a microwave detector coupled to said output controller for inconspicuous active microwave monitoring of said predefined three dimensional space, said microwave detector being disposed outside said predefined three dimensional space and offset by a structural partition therefrom, said microwave detector being operable to generate a detection signal responsive to objects moving in said predefined three dimensional space, and to transmit said detection signal to said output controller for selectively actuating said passive electric installation;
 a transmitter in connection with said output controller for transmitting data detected by said microwave detector; and at least one a remote equipment installation including:
- a receiver for receiving data transmitted by said transmitter; and
- an operation unit coupled to said receiver for selective operation according to the data received by said receiver;

whereby at least one remote equipment installation is actuated responsive to said microwave detector for simultaneous operation with said passive electric installation;

at least one of said passive electric installation and operation unit being disposed in said predefined three dimensional space.

2. The detecting system as in claim 1, wherein said operation unit includes a monitor and video set.

3. The detecting system as in claim 1, wherein said operation unit includes an alarming device.

4. The detecting system as in claim 1, wherein said operation unit includes a security network.

5. An intelligent microwave detecting system comprising:
- a passive electric installation coupled to a power supply source for generating an indication of intrusion upon a three dimensional space predefined by at least one structural partition disposed thereabout;
- a microwave detector disposed outside said predefined three dimensional space and offset by said structural partition therefrom for inconspicuous active microwave monitoring thereof, said microwave detector being operable to generate a detection signal responsive to a sensed movement in said predefined three dimensional space;
- an output controller coupled to said passive electric installation and said microwave detector for receiving said detection signal from said microwave detector and selectively enabling actuation of said passive electric installation responsive thereto;
- at least one remote equipment installation operably coupled to said output controller, said remote equipment installation including:
  - a receiver for receiving detection information from said output controller; and
  - a preselected operation unit coupled to said receiver for actuation responsive to said detection information;

whereby at least one preselected remote equipment unit is actuated responsive to said microwave detector for simultaneous operation with said passive electric installation;

at least one of said passive electric installation and preselected operation unit being disposed in said predefined three dimensional space.

* * * * *